(12) United States Patent
Rafalovich et al.

(10) Patent No.: US 7,237,395 B2
(45) Date of Patent: Jul. 3, 2007

(54) METHODS AND APPARATUS FOR CONTROLLING REFRIGERATORS

(75) Inventors: Alexander Pinkus Rafalovich, Louisville, KY (US); Ziqiang Hu, Prospect, KY (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 10/743,626

(22) Filed: Dec. 22, 2003

(65) Prior Publication Data

US 2005/0132733 A1   Jun. 23, 2005

(51) Int. Cl.
*F25B 5/00* (2006.01)
(52) U.S. Cl. .......................................... 62/199; 62/200
(58) Field of Classification Search ................ 62/199, 62/200, 180, 181, 183, 184, 229
See application file for complete search history.

(56) References Cited

U.S. PATENT DOCUMENTS

| | | |
|---|---|---|
| 1,798,951 A | 3/1931 | Munters |
| 1,865,513 A | 7/1932 | Gaugler |
| 2,120,185 A | 6/1938 | Philipp |
| 2,193,837 A | 3/1940 | Winther et al. |
| 2,241,070 A | 5/1941 | McLenegan |
| 2,323,354 A | 7/1943 | Rees |
| 2,428,312 A | 9/1947 | Herbener |
| 2,535,669 A | 12/1950 | Clay |
| 2,555,012 A | 5/1951 | Spofford |
| 2,604,761 A | 7/1952 | Atchison |
| 2,694,297 A | 12/1954 | Shoemaker |
| 2,772,076 A | 12/1956 | Matthews |
| 2,846,421 A | 8/1958 | Pollock |
| 2,856,506 A | 10/1958 | Telkes |
| 2,865,181 A | 12/1958 | Anderson et al. |
| 2,909,907 A | 10/1959 | Swanson |
| 3,147,602 A | 9/1964 | Beckwith |
| 3,638,444 A | 2/1972 | Lindahl |
| 4,030,312 A | 6/1977 | Wallin et al. |
| 4,283,925 A | 8/1981 | Wildfeuer |
| 4,545,213 A | 10/1985 | Fujiwara et al. |
| 4,644,758 A | 2/1987 | Machara et al. |
| 4,765,150 A | 8/1988 | Persem |
| 4,840,037 A * | 6/1989 | Yamada et al. ................ 62/199 |
| 4,862,707 A | 9/1989 | Hill et al. |
| 4,873,837 A | 10/1989 | Murray |
| 4,891,952 A | 1/1990 | Yoshikawa et al. |
| 4,896,512 A | 1/1990 | Howland |
| 4,916,916 A | 4/1990 | Fischer |
| 5,031,413 A | 7/1991 | Tsuihiji et al. |
| 5,033,272 A | 7/1991 | Yoshikawa et al. |
| 5,209,073 A | 5/1993 | Thomas et al. |
| 5,231,847 A | 8/1993 | Cur et al. |

(Continued)

*Primary Examiner*—Chen-Wen Jiang
(74) *Attorney, Agent, or Firm*—George L. Rideout, Esq.; Armstrong Teasdale LLP

(57) ABSTRACT

A method of switching refrigerant flow between a path to a fresh food evaporator in a fresh food compartment and a path to a freezer evaporator in a freezer compartment of a refrigerator, wherein the fresh food evaporator is coupled to a first fan and the freezer evaporator is coupled to a second fan, and wherein the method includes providing a three way valve with at least three operational positions in flow communication with the fresh food path and the freezer path, switching the three way valve between the operational positions, activating the first fan, deactivating the second fan, and delivering the refrigerant.

7 Claims, 9 Drawing Sheets

U.S. PATENT DOCUMENTS

| | | |
|---|---|---|
| 5,255,530 A | 10/1993 | Janke |
| 5,272,884 A * | 12/1993 | Cur et al. .................. 62/199 |
| 5,375,428 A | 12/1994 | LeClear et al. |
| 5,377,498 A | 1/1995 | Cur et al. |
| 5,428,965 A | 7/1995 | Grunwald et al. |
| 5,460,009 A | 10/1995 | Wills et al. |
| 5,465,591 A | 11/1995 | Cur et al. |
| 5,534,760 A | 7/1996 | Jung |
| 5,657,638 A | 8/1997 | Erdman et al. |
| 5,711,159 A | 1/1998 | Whipple, III |
| 5,857,349 A | 1/1999 | Hamaoka et al. |
| 5,970,733 A | 10/1999 | Hamaoka et al. |
| 6,000,232 A | 12/1999 | Witten-Hannah et al. |
| 6,185,948 B1 * | 2/2001 | Niki et al. .................. 62/199 |
| 6,220,042 B1 | 4/2001 | Robillard et al. |
| 6,952,930 B1 * | 10/2005 | Rafalovich et al. .......... 62/199 |

* cited by examiner

FIG. 5A

| | | | |
|---|---|---|---|
| ↙ Y | 30 AE  Area = Area5  COMP MED/Cond - SuperHI  FZ Fan HI  Valve B  FF Fan Off | 31 AF  Area = Area5  COMP MED/Cond - SuperHI  FZ Fan HI  Valve B  FF Fan Off | 32 AH  Area = Area7  COMP MED/Cond - SuperHI  FZ Fan HI  Valve NC  FF Fan NC |
| FZ EXTREME | 0 A  Area = Area5  Comp/Cond HI  FZ Fan HI  Valve B  FF Fan OFF | 1 B  Area = Area5  Comp/Cond HI  FZ Fan HIGH  Valve B  FF Fan OFF | 2 C  Area 1  If (Valve Not A) Area = Area1  Comp/Cond HI  FZ Fan High  Valve NC  FF Fan NC |
| FZ HIGH HYST 3  (FZXXHIHyst) | 6 G  Area = Area5  Comp/Cond Med  FZ Fan Med  Valve B  FF Fan OFF | 7 H  Area = Area5  Comp/Cond Med  FZ Fan Med  Valve B  FF Fan OFF | 8 I  Area 2  If NOT from Area 1  Area = Area2  If(Area Not Area3)Comp/Cond Med  If(Valve NOT A) Fz Fan High  Valve NC  FF Fan NC |
| FZ HIGH HYST 2  (FZXHIHyst) | 12 M  Area = Area5  Comp/Cond LOW  FZ Fan Low  Valve B  FF Fan OFF | 13 N  Area = Area5  Comp/Cond Low  FZ Fan Low  Valve B  FF Fan OFF | 14 O  Area 3  If Area = Area 1  Comp/Cond Med, FZ Fan HI  Valve C, Area = Area2  else Comp/Cond Low, If Valve not A FZ-Fan Low  Area = Area3  FF Fan NC |
| FZ HIGH HYST 1  (FZHIHyst) | 18 S  Area = Area5  Comp/Cond NC  FZ Fan NC  Valve NC  FF Fan OFF | 19 T  Area = Area5  if (Comp/Cond On)  Comp/Cond Low, FZ Fan Low  Valve B  else Valve A, Comp/Cond NC,Fz Fan NC  FF Fan OFF | 20 U  Area 4  If Area = Area 2  Comp/Cond Med, Fz Fan Off  Valve A, Area = Area3  else Comp/Cond NC, Valve NC, FZ  Area = Area4  FF Fan NC |
| FZ Target Temp | 24 Y  Area = Area0  Comp/Cond OFF  FZ Fan. OFF  Valve A  FF Fan OFF | 25 Z  Area = Area0  Comp/Cond OFF  FZ Fan. OFF  Valve A  FF Fan OFF | 26 AA Area = Area0  Comp/Cond Off  FZ Fan OFF  Valve A  FF Fan Off |
| FZ Low Hysteresis | | | |

| | | |
|---|---|---|
| 33 AH<br>Area = Area7<br>COMP MED/Cond - SuperHI<br>Fz Fan Med<br>Valve C<br>FF Fan MED | 34 AI<br>Area = Area7<br>COMP MED/Cond - SuperHI<br>Fz Fan Med<br>Valve C<br>FF Fan MED | 35 AJ<br>Area = Area7<br>COMP MED/Cond - SuperHI<br>Fz Fan Med<br>Valve C<br>FF Fan MED |
| 3 D Area1<br>Area = Area1<br>Comp/Cond HI<br>Fz Fan High<br>Valve C<br>FF FAN LOW | 4 E Area1<br>Area = Area1<br>Comp/Cond HI<br>Fz Fan High<br>Valve C<br>FF FAN MED | 5 F Area1<br>Area = Area1<br>Comp/Cond HI<br>Fz Fan High<br>Valve C<br>FF FAN High |
| 9 J Area2<br>If NOT from Area 1<br>Comp/Cond Med,Fz Fan HI<br>Area = Area2<br>Valve C<br>FF Fan Low | 10 K Area2<br>If NOT from Area 1<br>Comp/Cond Med<br>Fz Fan High<br>Valve C<br>FF FAN MED<br>Area = Area2 | 11 L Area1<br>Area = Area1<br>Comp/Cond HIGH<br>Fz Fan Off<br>Valve C<br>FF FAN High |
| 15 P Area3<br>If Area = Area1<br>Comp/Cond Med, Fz Fan HI<br>Valve C<br>else Comp/Cond Low,Fz Fan Off<br>Valve A, Area = Area3<br>FF Fan Low | 16 Q Area2<br>If NOT from Area1<br>Comp/Cond Med<br>Fz Fan Off<br>Valve A<br>Area = Area2<br>FF FAN MED | 17 R Area1<br>Area = Area1<br>Comp/Cond Med<br>Fz Fan Off<br>Valve A<br>FF FAN HIGH |
| 21 V Area3<br>Comp/Cond Low, Fz Fan Off<br>Valve A<br><br>Area = Area3<br>FAN LOW | 22 W Area2<br>Comp/Cond Med<br>Fz Fan Off<br>Valve A<br>Area = Area2<br>FF FAN MED | 23 X Area1<br>Area = Area1<br>Comp/Cond Med<br>Fz Fan Off<br>Valve A<br>FF FAN High |
| 27 AB<br>Area = Area6<br>Comp/Cond LOW<br>Fz Fan Off<br>Valve A<br>FF FAN LOW | 28 AC<br>Area = Area6<br>Comp/Cond LOW<br>Fz Fan Off<br>Valve A<br>FF FAN MED | 29 AD<br>Area = Area6<br>Comp/Cond MED<br>Fz Fan Off<br>Valve A<br>FF Fan High |

| Figure 5A | | FF No Freez | FF Low Hysteresis | FF Target Temp | Figure 5D → |

*If Valve is in A position FZFan is off and FFFan runs at least in Low Speed*
*If Valve is in B position FZFan runs at least in Low speed and FFFan is off*
NOTE (1): DAMPER OPENS & FF FAN ON LOW AT SS START, THEN CHECKS FOR PROPER POSITION NEXT LOGIC CYCLE
NOTE (2): FOR BPO & QUANTUM FZ Fan MEDIUM    NA
NOTE (3): If the FF temperature has not gotten colder by 0.15F within 30 minutes of the damper opening, boost the FZ Fan fz
NOTE (4): EFOSSO = evaporator fan on sealed system off (part of the configuration byte)

FFRollAvg = FFTHERMIST
FZRollAvg = FFTHERMIST
FFLTAVG3 = Beta * FFLTAVG3 + (1 - Beta) * FFRollAvg * added by RMB 6/1
FZLTAVG3 = Beta * FZLTAVG3 + (1 - Beta) * FZRollAvg * added by RMB 6/1
FFLTAVG2 = Beta * FFLTAVG2 + (1 - Beta) * FFLTAVG3 * added by RMB 6/
FZLTAVG2 = Beta * FZLTAVG2 + (1 - Beta) * FZLTAVG3 * added by RMB 6/
FFLTAVG = Beta * FFLTAVG + (1 - Beta) * FFLTAVG2 * moved by RMB 6/1/
FZLTAVG = Beta * FZLTAVG + (1 - Beta) * FZLTAVG2 * moved by RMB 6/1/

← Figure 5C | FF HIGH HYST 1 | FF HIGH HYST 2 | FF HIGH HYST 3 | Figure 5B →

(FFHI Hyst)     (FFXHI Hyst)     (FFXXHI Hyst)

400

*If Valve is in C position FZ and FF fans run at least in Low speed*

NOTE (5): ONF = obey no freeze limit (part of the configuration byte)
NOTE (6): MS = medium speed (part of the configuration byte)
NOTE (7): See included worksheet in order to calculate the configuration byte If (FFLTAVG - {TFFTARGET + FFOFF} > 1) Then
   FFERROR = FFERROR - 0.1
Elseif (FFLTAVG - TFFTARGET - FFOFF > 0.2) Then
   FFERROR = FFERROR - 0.02
Elseif (FFLTAVG - TFFTARGET - FFOFF < -1) Then
   FFERROR = FFERROR + 0.1
Elseif (FFLTAVG - TFFTARGET - FFOFF < -0.2) Then
   FFERROR = FFERROR + 0.02
End if
If FFERROR > FFHiHyst+2 Then FFERROR = FFHiHyst+2
If FFERROR < FFLowHyst Then FFERROR = FFLowHyst If (FZLTAVG - TFRTARGET - FZOFF > 1) Then
   FZERROR = FZERROR - 0.1
Elseif (FZLTAVG - TFRTARGET - FZOFF > 0.2) Then
   FZERROR = FZERROR - 0.02
Elseif (FZLTAVG - TFRTARGET - FZOFF < -1) Then
   FZERROR = FZERROR + 0.1
Elseif (FZLTAVG - TFRTARGET - FZOFF < -0.2) Then
   FZERROR = FZERROR + 0.02
End if
If FZERROR > FZHIHyst Then FZERROR = FZHiHyst
If FZERROR < FZLowHyst Then FZERROR = FZLowHyst

FIG. 5D

METHODS AND APPARATUS FOR CONTROLLING REFRIGERATORS

BACKGROUND OF THE INVENTION

This invention relates generally to refrigerators, and more particularly, to control systems for refrigerators.

Some known multi-evaporators refrigerator include a fresh food compartment and a freezer compartment. Such a refrigerator also typically includes a sealed refrigeration system including a compressor, a plurality of evaporators, a multi-way valve, and a condenser connected in series. Each evaporator includes a fan configured to blow air over the evaporator.

In operation, the valve is selectively operated to direct a refrigerant between evaporators. Depending on a position of the valve and refrigerator compartment conditions, part of refrigerant may flood in one evaporator and unavailable for use in another.

BRIEF DESCRIPTION OF THE INVENTION

In one aspect, a method of switching refrigerant flow between a path to a fresh food evaporator in a fresh food compartment and a path to a freezer evaporator in a freezer compartment of a refrigerator, wherein the fresh food evaporator is coupled to a first fan and the freezer evaporator is coupled to a second fan is provided. The method includes providing a three way valve with at least three operational positions in flow communication with the fresh food path and the freezer path, switching the three way valve between the operational positions, activating the first fan, deactivating the second fan, and delivering the refrigerant.

In another aspect, a method of switching refrigerant flow between a path to a freezer evaporator in a freezer compartment and a path to a fresh food evaporator in a fresh food compartment of a refrigerator using a three way valve is provided. The method includes measuring a $dt_F$ between a fresh food compartment temperature and a fresh food evaporator evaporating temperature, measuring a $dt_Z$ between a freezer compartment temperature and a freezer evaporator evaporating temperature, switching the three way valve between operational positions, activating a freezer evaporator fan until $dt_Z$ reduces to a first predetermined temperature difference, delaying activation of a fresh food evaporator fan until $dt_F$ increases to a second predetermined temperature difference, and delivering the refrigerant evaporator.

In another aspect, a method of operating a valve to switch refrigerant flow between a path to a fresh food evaporator in a fresh food compartment and a path to a freezer evaporator in a freezer compartment of a refrigerator is provided. The method includes providing a three-way valve with at least three operational positions in flow communication with the fresh food path and the freezer path, switching the valve to a first operational position when a measured fresh food compartment temperature is not within a range around a fresh food setpoint and a measured freezer compartment temperature is within a range around a freezer setpoint, switching the valve to a second operational position when the measured freezer compartment temperature is not within the range around the freezer setpoint and the measured fresh food compartment temperature is within the range around the fresh food setpoint, switching the valve to a third operational position when the measured freezer compartment temperature and the measured fresh food compartment temperature are not within a range around the each setpoint respectively such that both the fresh food and the freezer evaporators receive refrigerant.

In another aspect, a refrigerator including a sealed refrigeration system is provided. The refrigerator includes a fresh food compartment including a fresh food evaporator positioned therein, a fresh food fan coupled to the fresh food evaporator and operable for cooling the fresh food compartment, a freezer compartment including a freezer evaporator positioned therein, a freezer fan coupled to the freezer evaporator and operable for cooling said freezer compartment, a compressor operationally coupled to the fresh food evaporator and the freezer evaporator, and a condenser including a condenser fan coupled to compressor. The refrigerator also includes a three-way valve coupled to the fresh food and freezer compartments via a fresh food metering device and a freezer metering device, wherein the three-way valve is configured to operate between a plurality of positions and a control logic grid in operational control of the fresh food fan, the freezer fan, the condenser fan, and the compressor.

BRIEF DESCRIPTION OF THE DRAWINGS

FIG. 5 is a diagram of a control grid for operating the refrigerator in FIG. 1;

DETAILED DESCRIPTION OF THE INVENTION

Figure 1:
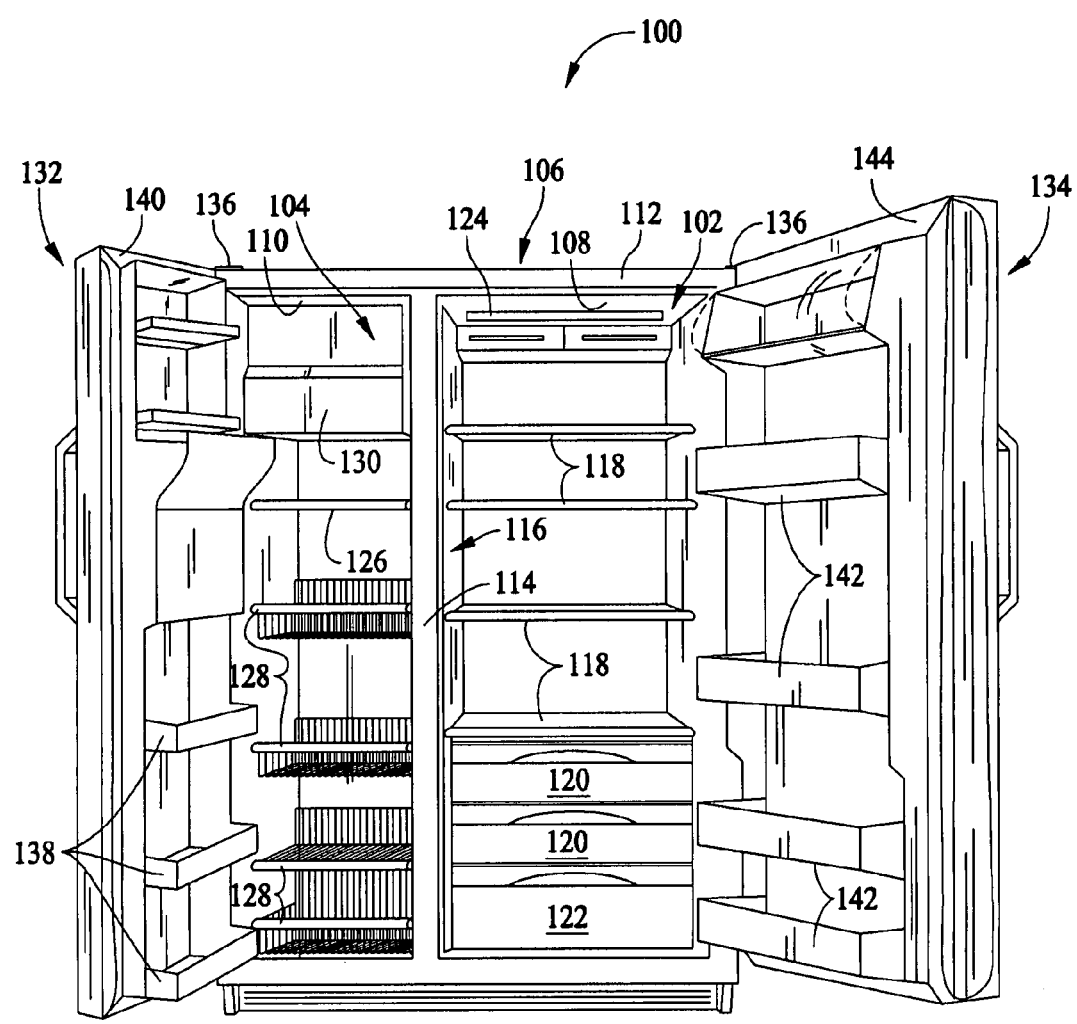
FIG. 1 is a perspective view of a refrigerator.

FIG. 1 illustrates a side-by-side refrigerator 100 including a fresh food storage compartment 102 and freezer storage compartment 104. Freezer compartment 104 and fresh food compartment 102 are arranged side-by-side. In one embodiment, refrigerator 100 is a commercially available refrigerator from General Electric Company, Appliance Park, Louisville, Ky. 40225, and is modified to incorporate the herein described methods and apparatus.

It is contemplated, however, that the teaching of the description set forth below is applicable to other types of refrigeration appliances, including but not limited to top and bottom mount refrigerators wherein undesirable temperature gradients exist. The present invention is therefore not intended to be limited to be limited to any particular type or configuration of a refrigerator, such as refrigerator 100.

Refrigerator 100 includes a fresh food storage compartment 102 and a freezer storage compartment 104 contained within an outer case 106 and inner liners 108 and 110. A space between case 106 and liners 108 and 110, and between liners 108 and 110, is filled with foamed-in-place insulation. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100. Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, together with the insulation and liner sides it is commonly referred to as a mullion 114. Breaker strip 112 and mullion 114 form a front face, and extend completely around inner peripheral edges of case 106 and vertically between liners 108, 110.

Shelves 118 and slide-out drawers 120 normally are provided in fresh food compartment 102 to support items being stored therein. A bottom drawer or pan 122 could be a system with an independent temperature control, for example, a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator or freezer compartments via fans (not shown in FIG. 1). Collectively, the vapor compression cycle components in a refrigeration circuit, associated fans, and associated compartments are referred to herein as a sealed system.

Figure 2:
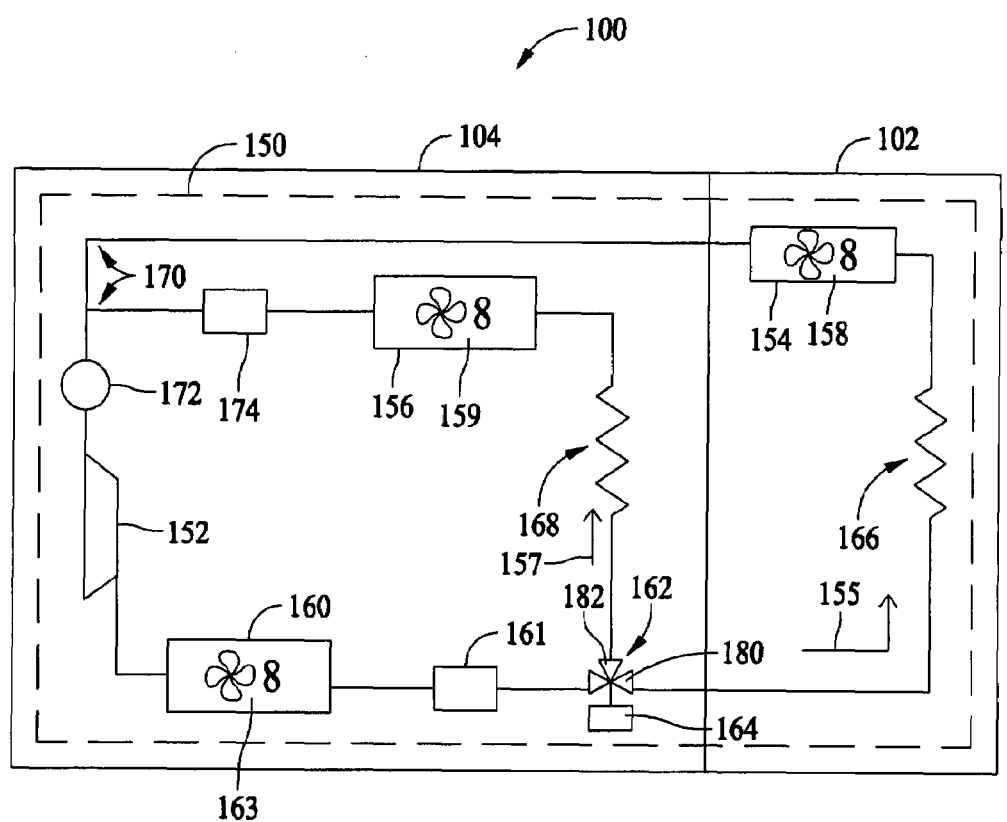
FIG. 2 is a schematic illustration of the exemplary refrigerator.

FIG. 2 is a schematic illustration of refrigerator 100 including a refrigeration system 150. System 150 includes a compressor 152 configured to deliver refrigerant to a fresh food evaporator 154 via a fresh food refrigerant path 155 and to a freezer evaporator 156 via freezer refrigerant path 157. In the exemplary embodiment, compressor 152 is a variable speed compressor, fresh food evaporator 154 is a high temperature evaporator, and freezer evaporator 156 is a low temperature evaporator. In one embodiment, a variable speed fan 158 is coupled to fresh food evaporator 154 and a variable speed fan 159 is coupled to freezer evaporator 156 each fan configured to circulate air through each evaporator respectively.

Compressor 152 is connected in series to a condenser 160, a dryer 161, and a three-way valve 162 with a step motor 164. In one embodiment, condenser 160 is coupled to a variable speed fan 163. In alternative embodiment, condenser 160 is coupled to a constant speed fan 163. Three-way valve 162 is utilized to switch refrigerant flow from one evaporator to another depending on the temperatures in fresh food and freezer compartments 102 and 104. In one embodiment, compressor 152, condenser 160, dryer 161, and three-way valve 162 are positioned in the machinery compartment.

Refrigerant selectively flows from three-way valve 162 through a first metering device 166 to fresh food evaporator 154 and through a second metering device 168 to freezer evaporator 156. In the exemplary embodiment, first and second metering devices 166, 168 are capillary tubes. A pair of suction lines 170 couple fresh food evaporator 154 and freezer evaporator 156 to an accumulator 172. A check valve 174 is positioned between freezer evaporator 156 and accumulator 172. Accumulator 172 is in flow communication with compressor 152.

Step motor 164 of three-way valve 162 operates by a series of impulses that moves valve 162 incrementally in a plurality of steps between a plurality of operational positions, discussed in greater detail below. In the exemplary embodiment, three-way valve 162 has three operational positions. These operational positions include position A, where only a first outlet port 180 is open and all refrigerant from compressor 152 flows through fresh food evaporator 154. Position B is where first outlet port 180 is closed and a second outlet port 182 is open and all refrigerant from compressor 152 flows through freezer evaporator 156. Position C is where both first and second outlet ports 180, 182 are open and refrigerant from compressor 152 flows through fresh food evaporator 154 and freezer evaporator 156 in a parallel manner.

In an alternative embodiment, three-way valve 162 has four operational positions Positions A, B, C, and D. Positions A, B, and C are discussed above. Position D is where both outlet ports 180, 182 are closed and refrigerant from compressor 152 is blocked from entering either fresh food evaporator 154 or freezer evaporator 156.

Figure 3:
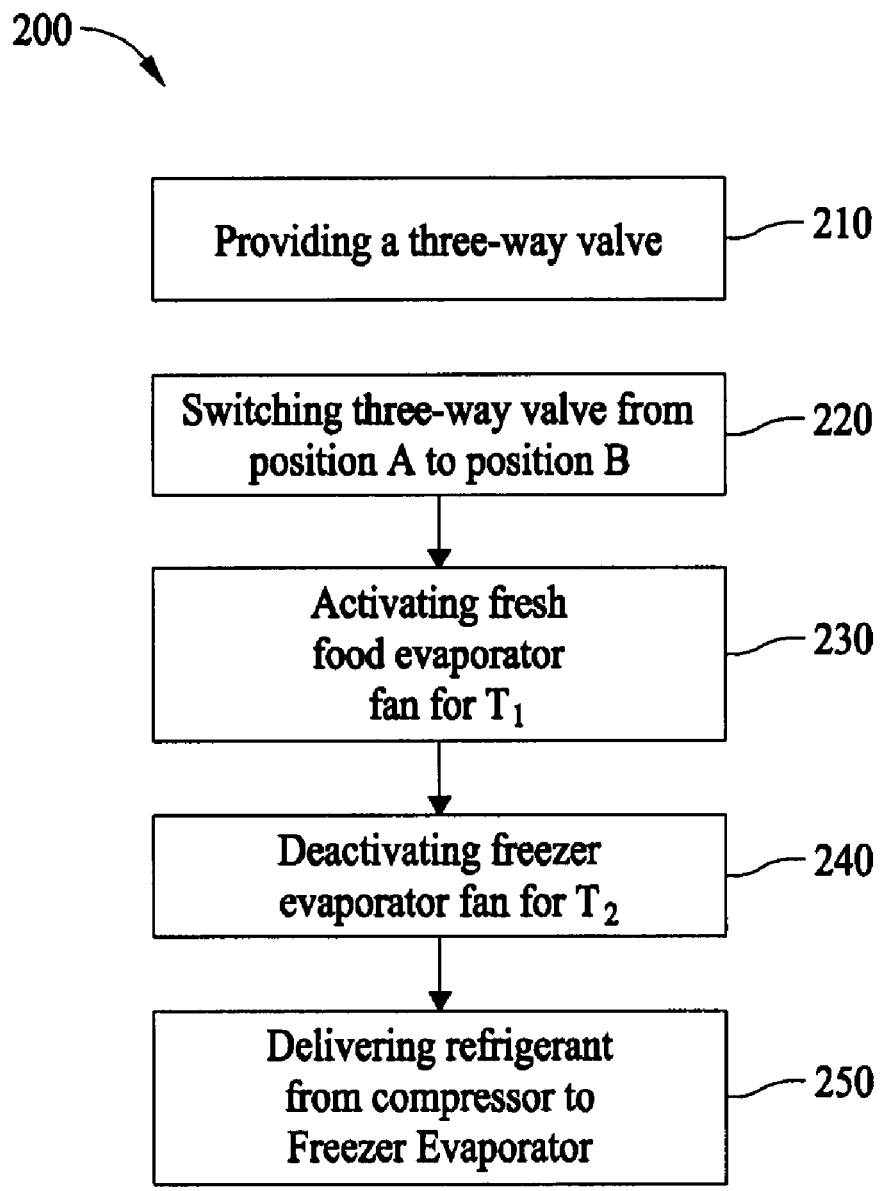
FIG. 3 is a flow diagram illustrating a method of operating a fresh food evaporator fan and a freezer evaporator fan in recovery mode shown in FIG. 2.

FIG. 3 is a diagram of a method 200 of operating valve 162 in recovery mode controlled by predetermined times. It takes time, for example, to transmit refrigerant from fresh food evaporator 154 to compressor 152 and then to freezer evaporator 156. In one embodiment, recovery method 200 includes providing 210 three way valve 162 that is in flow communication with fresh food path 155 and freezer pat 157, switching 220 valve 162 from position A to position B and activating 230 fresh food fan 158 for a first time period $T_1$. The lack of fresh refrigerant to fresh food evaporator 154 and the air blowing from fresh food fan 158 facilitate a gradual evaporation of refrigerant. Recovery method 200 also includes deactivating 240 freezer fan 159 for a second time period $T_2$. A lack of sufficient amount of liquid refrigerant in freezer evaporator 156 reduces an evaporating temperature and pressure, and drives refrigerant from fresh food evaporator where the pressure becomes higher to compressor 152 and then is delivered 250 to freezer evaporator 156.

It can be appreciated that the same type of recovery method may be used when valve 162 switches from position B to position A. In that case, freezer fan 159 runs for first time period $T_1$ The lack of fresh refrigerant to freezer evaporator 156 and the air blowing from freezer fan 159 facilitate a gradual evaporation of refrigerant. Fresh food fan 158 is deactivated for a second time period $T_2$. A lack of sufficient amount of liquid refrigerant in fresh food evaporator 154 reduces an evaporating temperature and pressure, and drives refrigerant from freezer evaporator 156 where the pressure becomes higher to compressor 152 and then is delivered to fresh food evaporator 154.

Figure 4:
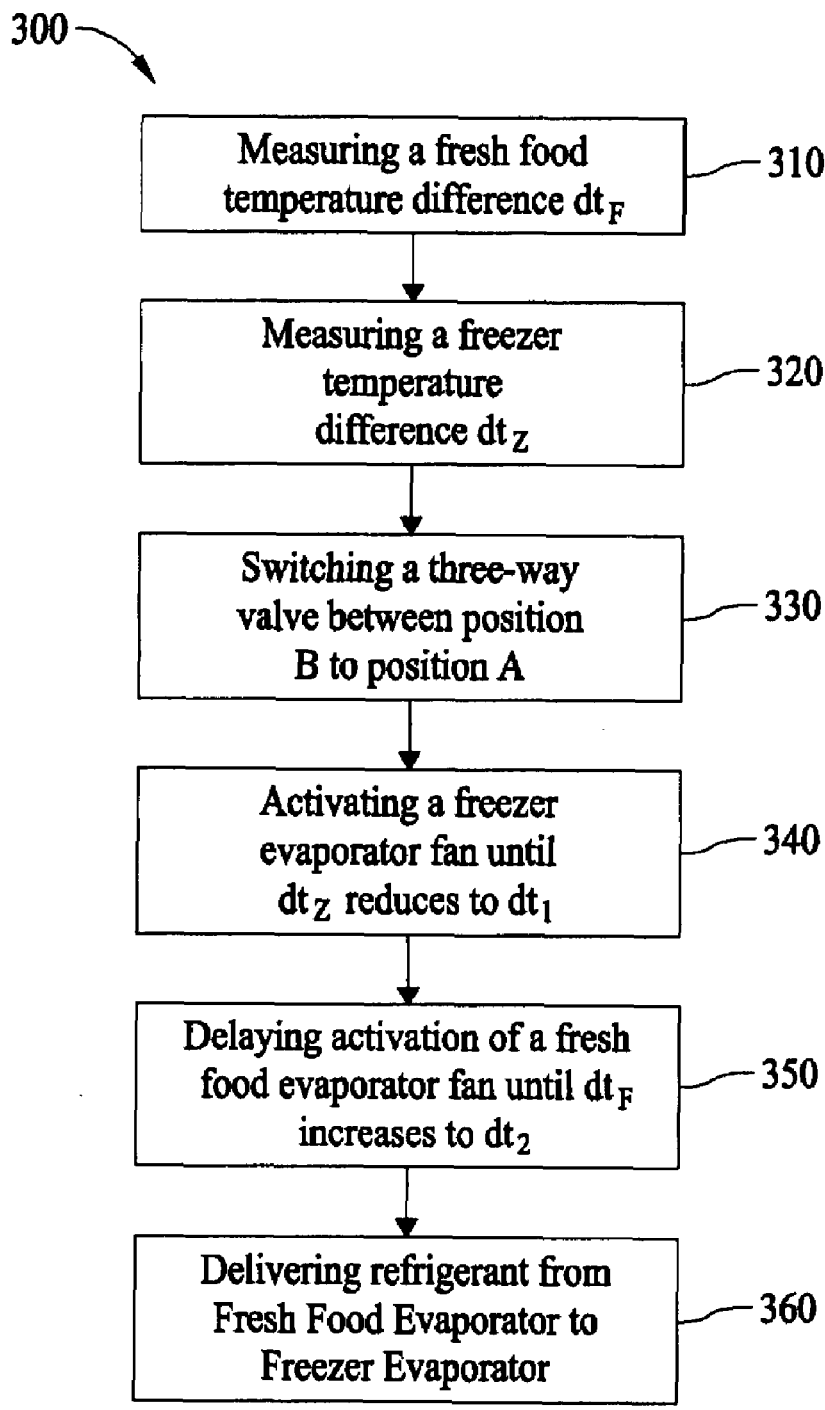
FIG. 4 is a flow diagram illustrating another method of operating the fresh food evaporator fan and the freezer evaporator fan in recovery mode shown in FIG. 2.

FIG. 4 is another recovery method 300 of operating valve 162 in recovery mode controlled by the temperature difference (dt) between the temperature in a compartment and the associated evaporator's evaporating temperature. Specifically, measuring 310 a fresh food temperature difference ($dt_F$) between a fresh food compartment temperature and a fresh food evaporator evaporating temperature and measuring 320 a freezer temperature difference ($dt_Z$) between a freezer compartment temperature and a freezer evaporator evaporating temperature. Recovery mode further includes switching 330 valve 162 from position B to position A and activating 340 freezer fan 159 until the temperature difference between the freezer compartment and freezer evaporator reduces to a first predetermined temperature difference ($dt_1$). Delaying 350 fresh food fan 158 activation until the temperature difference between the freezer compartment and the freezer evaporator increases to a second predetermined temperature difference ($dt_2$). This way the pressure in fresh food evaporator 154 goes down and the pressure in freezer evaporator 156 goes up thereby and enhances delivering 360 refrigerant from fresh food evaporator 154 to freezer evaporator 156.

In one embodiment, multiple speed compressor and fan logic is utilized to increase cooling efficiency and decrease energy consumption. Based on the temperatures of the compartments, the position of the valve 162, the speeds of compressor 152, freezer fan 159, fresh food fan 158, and condenser fan 163 are controlled by a control system (not shown) utilizing a control logic grid 400, as shown in FIG. 5. Control grid 400 includes fresh food compartment temperature on an x-axis 410 and freezer food compartment temperature on a y-axis 420.

Control grid 400 is divided into 8 sections or areas numbering from Area 0 to Area 7, wherein some Areas are derivative sensitive. For example, in some areas, control grid 400 takes into account whether the previous area had a increase in temperature (ie. the temperature has a negative derivative). In other areas, control grid 400 takes into account whether the previous area had a decrease in temperature (ie. the temperature has a positive derivative).

Area 0 includes cells 24Y, 25Z, and 26AA. Area 1 includes cells 2C, 3D, 4E, 5F, 11L, 17R and 23X. Area 2 includes cells 8I, 9J, 10K, 16Q, and 22W. Area 3 includes cells 14O, 15P, and 21V. Area 4 includes cell 20U. Area 5 includes cells 0A, 1B, 6G, 7H, 12M, 13N, 18S, and 19T. Area 6 includes cells 27AB, 28AC, and 29AD. Area 7 includes cells 32AH, 33AH, 34AI, and 35AJ.

In Area 0 of control grid 400, all the fans and compressor 152 are shut down and valve 162 is in position A. When sealed system 150 enters Area 1, which is far from a setpoint 390, system 150 runs with a higher capacity. Valve 162 is usually in position C thereby refrigerating both the evaporators 154 and 156. When system 150 is moving towards Area 2, system 150 maintains Area 1 settings in order to pull down efficiently. Otherwise, system 150 and fans 158 and 159 run in medium speeds and valve 162 is in positions A or C.

If system 150 is moving towards Area 3 from Area 1, Area 2 settings come into effect in Area 3. Otherwise, system 150 and fans 158 and 159 run in low speeds. When system 150 enters Area 4, system 150 experiences no change. In Area 5, valve 162 is in position B (freezer evaporator only) and thus only freezer evaporator 156 is cooled until it reaches a predetermined setpoint. (However, in cell 19T, when compressor 152 is not on, valve 162 is in position A). In Area 6, valve 162 is in position A (fresh food evaporator only) and only fresh food evaporator 154 is cooled until it reaches the setpoint. In Area 7, the system 150 and fans 158 and 159 run in medium speeds except condenser fan 163 which operates in a higher speed. This mode helps system 150 to be stable in high ambient conditions.

As discussed above, valve 162 is selectively positionable between positions A, B, C, and/or D. During low usage periods, temperatures in both fresh food compartment 102 and freezer compartment 104 are close to target temperature (below both freezer and fresh food 1st high hysteresises—squares 19, 20, 25, 26 in control logic grid 400). During this operation, valve 162 is in either in position A, B, or D, compressor fan 163 and evaporator fans 158 and 159 are at low speed. Any extra refrigerant is stored in accumulator 172. This is the most energy efficient refrigeration system operation.

During high usage periods, for example, during meal and snack times, during the addition of new grocery items, and during and after defrost operation, the temperature in one or both compartments 102 and 104 may exceed the first, second, or even third hysteresis (squares 2, 3, 4, 5, 8, 9, 10, 11, 14, 15, 16, 17, 21, 22, and 23 in control logic grid 400). In order to keep up with the increased capacity, compressor fans 163 is set to run at medium or high speed.

During high usage periods valve 162 is typically in position C providing both evaporators 154 and 156 with refrigerant. The refrigerant flows simultaneously through metering devices 166 and 168 to expand refrigerant before both evaporators 154 and 156. During this operation, both compartments 102 and 104 are provided with cooling which simultaneously moves both compartment temperatures closer to target temperatures.

Figure 6:
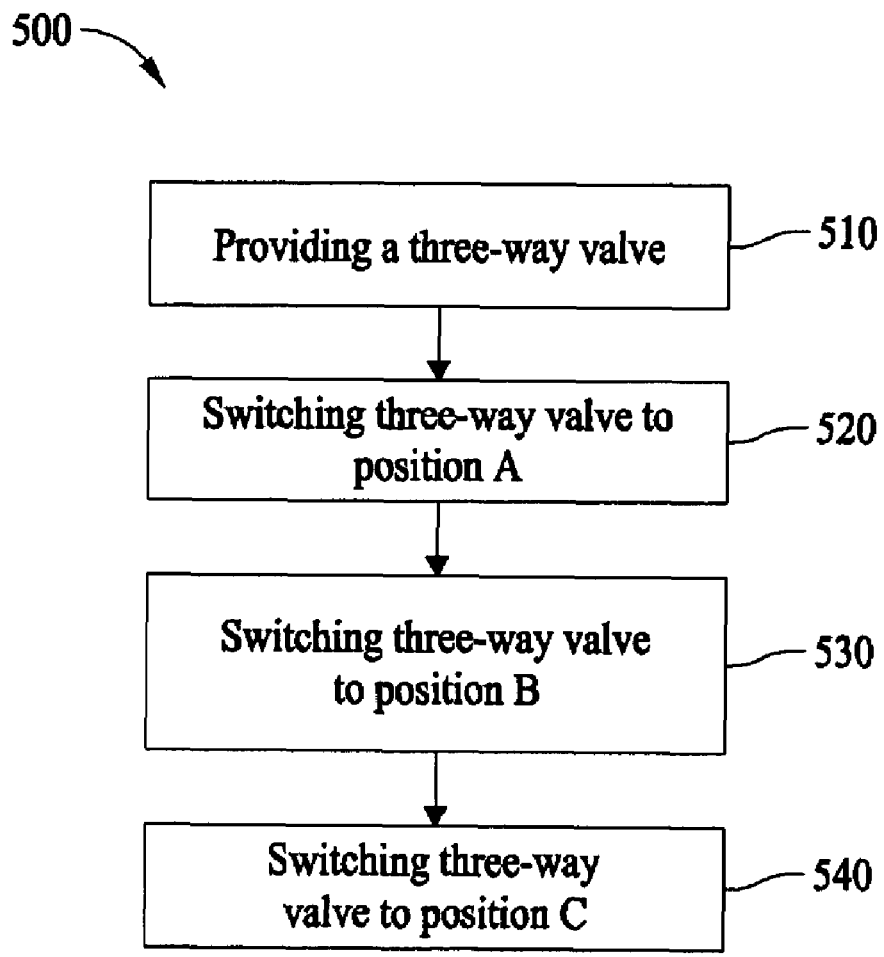
FIG. 6 is a flow diagram of a method of operating the three-way valve in FIG. 2.

FIG. 6 is method 500 of operating a three way valve 162 when compartments 102 and 104 temperatures are far away from predetermined target temperatures, for example, during high usage periods. Method 500 includes providing 510 three way valve 162 selectively positionable between at least three operational positions in flow communication with fresh food path 155 and freezer path 157, switching 520 valve 162 to position A when a measured fresh food compartment temperature is not within a range around a fresh food setpoint (for example, more than 2.5 degrees higher than a fresh food target temperature) and a measured freezer compartment temperature is within a range around a freezer setpoint (for example, not more than 5 degrees higher than a freezer target temperature), switching 530 valve 162 to position B when the measured freezer compartment temperature is not within the range around the freezer setpoint (for example, more than 5 degrees higher than a freezer target temperature) and the measured fresh food compartment temperature is within the range around the fresh food setpoint (for example, not more than 2.5 degrees higher than a fresh food target temperature), switching 540 valve 162 to position C when the measured freezer compartment temperature and the measured fresh food compartment temperature are not within a range around the each setpoint respectively such that both evaporators receive refrigerant.

Exemplary embodiments of refrigerator systems are described above in detail. The systems are not limited to the specific embodiments described herein, but rather, components of each assembly may be utilized independently and separately from other components described herein. Each refrigerator component can also be used in combination with other refrigerator and evaporator components.

While the invention has been described in terms of various specific embodiments, those skilled in the art will recognize that the invention can be practiced with modification within the spirit and scope of the claims.

What is claimed is:

1. A method for regulating refrigerant flow in a sealed refrigerant system comprising a fresh food path to a fresh food evaporator in a fresh food compartment and a freezer path to a freezer evaporator in a freezer compartment wherein the fresh food path and the freezer path are in flow communication with a compressor, said method comprising:

providing a three-way valve in flow communication with the compressor for regulating refrigerant flow through the fresh food path and the freezer path;

directing the refrigerant flow by moving the three-way valve to one operational position of a plurality of operational positions, the plurality of operational positions comprising a first operational position for directing the refrigerant flow from the fresh food path to the freezer path and a second operational position for directing the refrigerant flow from the freezer path to the fresh food path, with the three-way valve in the first operational position, a fresh food fan coupled to the fresh food evaporator continues to operate for a first time period and a freezer fan coupled to the freezer evaporator is activated after a second time period, and with the three-way valve in the second operational position, the freezer fan continues to operate for a third time period and the fresh food fan is activated after a fourth time period.

2. A method according to claim 1 wherein providing a three-way valve comprises providing a three-way valve wherein the first operational position comprises opening a first outlet port and closing a second outlet port such that refrigerant flows through the fresh food path, the second operational position comprises closing the first outlet port and opening the second outlet port such that refrigerant flows through the freezer path, and the third operational position comprises opening both first and second outlet ports such that refrigerant flows through the fresh food path and the freezer path in a parallel manner.

3. A method according to claim 1 wherein said directing the refrigerant flow by moving the three-way valve to one operational position includes the plurality of operational positions further comprising a third operational position for directing the refrigerant flow through the fresh food path and the freezer path.

4. A refrigerator including a sealed refrigeration system comprising:

a fresh food compartment including a fresh food evaporator positioned therein, a fresh food fan coupled to said fresh food evaporator and operable for cooling said fresh food compartment;

a freezer compartment including a freezer evaporator positioned therein, a freezer fan coupled to said freezer evaporator and operable for cooling said freezer compartment;

a compressor operationally coupled to said fresh food evaporator and said freezer evaporator;

a condenser including a condenser fan coupled to said compressor;

a three-way valve coupled to said fresh food and freezer compartments via a fresh food metering device and a freezer metering device, said three-way valve configured to operate between a plurality of operational positions; and a control logic grid in operational control of said fresh food fan, said freezer fan, said condenser fan, and said compressor, said control logic grid configured, with the three-way valve in a first operational position of said plurality of operational positions, to continue to operate said fresh food fan for a first time period and to activate said freezer fan after a second time period, and with the three-way valve in a second operational position of said plurality of operational positions, to continue to operate said freezer fan for a third time period and to activate said fresh food fan after a fourth time period.

5. A refrigerator according to claim 4 wherein said three-way valve further comprises a third operational position, said first operational position comprises opening a first outlet port and closing a second outlet port such that refrigerant flows through said fresh food evaporator, said second operational position comprises closing said first outlet port and opening said second outlet port such that refrigerant flows through said freezer evaporator, and said third operational position comprises opening both said first outlet port and said second outlet port such that refrigerant flows through said fresh food evaporator and said freezer evaporator in a parallel manner.

6. A refrigerator according to claim 5 wherein said three-way valve is configured to:

switch to said first operational position when a measured fresh food compartment temperature is not within a fresh food setpoint range and when a measured freezer compartment temperature is within a freezer setpoint range;

switch to said second operational position when the measured freezer compartment temperature is not within the freezer setpoint range and when the measured fresh food compartment temperature is within the fresh food setpoint range; and switch to said third operational position when the measured freezer compartment temperature is not within the freezer setpoint range and when the measured fresh food compartment temperature is not within the fresh food setpoint range.

7. A refrigerator according to claim 5 further comprising an accumulator in flow communication with said fresh food evaporator, said freezer evaporator, and said compressor and configured to store excess refrigerant.

* * * * *